United States Patent [19]
Wang

[11] Patent Number: 5,733,038
[45] Date of Patent: Mar. 31, 1998

US005733038A

[54] PROTECTIVE DEVICE FOR A STAND LAMP

[76] Inventor: Jack Wang, No. 227, Nan-Yang-Hsin Tsun, Nan-Yang Rd., Feng-Yuan City, Taichung Hsien, Taiwan

[21] Appl. No.: 834,546

[22] Filed: Mar. 19, 1997

[51] Int. Cl.⁶ ............................................... F21V 25/12
[52] U.S. Cl. ...................... 362/394; 362/276; 362/802
[58] Field of Search .......................... 362/276, 376, 362/394, 395, 802

[56] References Cited

U.S. PATENT DOCUMENTS 5,073,846  12/1991  Lin ............................................. 362/263
5,660,464  8/1997   Lin ............................................. 362/394 X

*Primary Examiner*—Stephen F. Husar
*Attorney, Agent, or Firm*—Brinks Hofer Gilson & Lione

[57] ABSTRACT

A protective device is used with a stand lamp which includes an upright lamp stand, a lamp base mounted on a top end of the lamp stand, a reflector mounted on the lamp base, and a lamp mounted horizontally on the lamp base and confined by the reflector. The protective device includes at least one sensor unit adapted to be mounted on the reflector and capable of generating a sensor light signal corresponding to intensity of light detected thereby, and a control circuit connected electrically to the sensor unit and adapted to interconnect electrically the lamp and a power source. The control circuit is capable of disconnecting the lamp from the power source upon detection that the sensor light signal has reached a level indicative of a condition that the reflector is covered by an object to prevent occurrence of a fire.

8 Claims, 6 Drawing Sheets

PROTECTIVE DEVICE FOR A STAND LAMP

BACKGROUND OF THE INVENTION

1. Field of the Invention

The invention relates to a protective device for a stand lamp, more particularly to a protective device for a high-wattage halogen stand lamp capable of deactivating the stand lamp automatically when a flammable object covers a reflector of the latter.

2. Description of the Related Art

Halogen stand lamps are commonly found in living rooms and bedrooms and serve to direct light upward to radiate the ceiling of a room in order to create a pleasant environment. Referring to FIG. 1, a conventional halogen stand lamp 10 comprises an upright hollow lamp stand 11, a bowl-shaped lamp base 12 mounted on a top end of the lamp stand 11, a ring-shaped reflector 13 mounted on the lamp base 12, a halogen lamp 14 mounted horizontally on the lamp base 12 and confined by the reflector 13, a cover piece 15 mounted on the reflector 13 above the halogen lamp 14 for protecting the halogen lamp 14, and a three-way power switch 16 mounted on the lamp stand 11 and manually operable so as to control activation and deactivation of the halogen lamp 14.

The halogen lamp 14 usually has a relatively high wattage of about 300 watts, and when the halogen lamp 14 is in operation, the temperature of the reflector 13 can reach up to 270°. As such, a fire can easily occur when a flammable object, such as a curtain, is blown into the lamp base 12 and touches the reflector 13.

SUMMARY OF THE INVENTION

Therefore, the object of the present invention is to provide a protective device for a high-wattage stand lamp, such as a halogen stand lamp, capable of automatically deactivating the latter when a flammable object covers a reflector of the stand lamp to prevent the occurrence of a fire.

According to the present invention, a protective device is adapted for use with a stand lamp which includes an upright lamp stand, a lamp base mounted on a top end of the lamp stand, a reflector mounted on the lamp base, and a lamp mounted on the lamp base and confined by the reflector. The protective device comprises:

at least one sensor unit adapted to be mounted on the reflector and capable of generating a sensor light signal corresponding to intensity of light detected thereby; and a control circuit connected electrically to the sensor unit and adapted to interconnect electrically the lamp and a power source, the control circuit being capable of disconnecting the lamp from the power source upon detection that the sensor light signal has reached a level indicative of a condition that the reflector is covered by an object to prevent occurrence of a fire.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
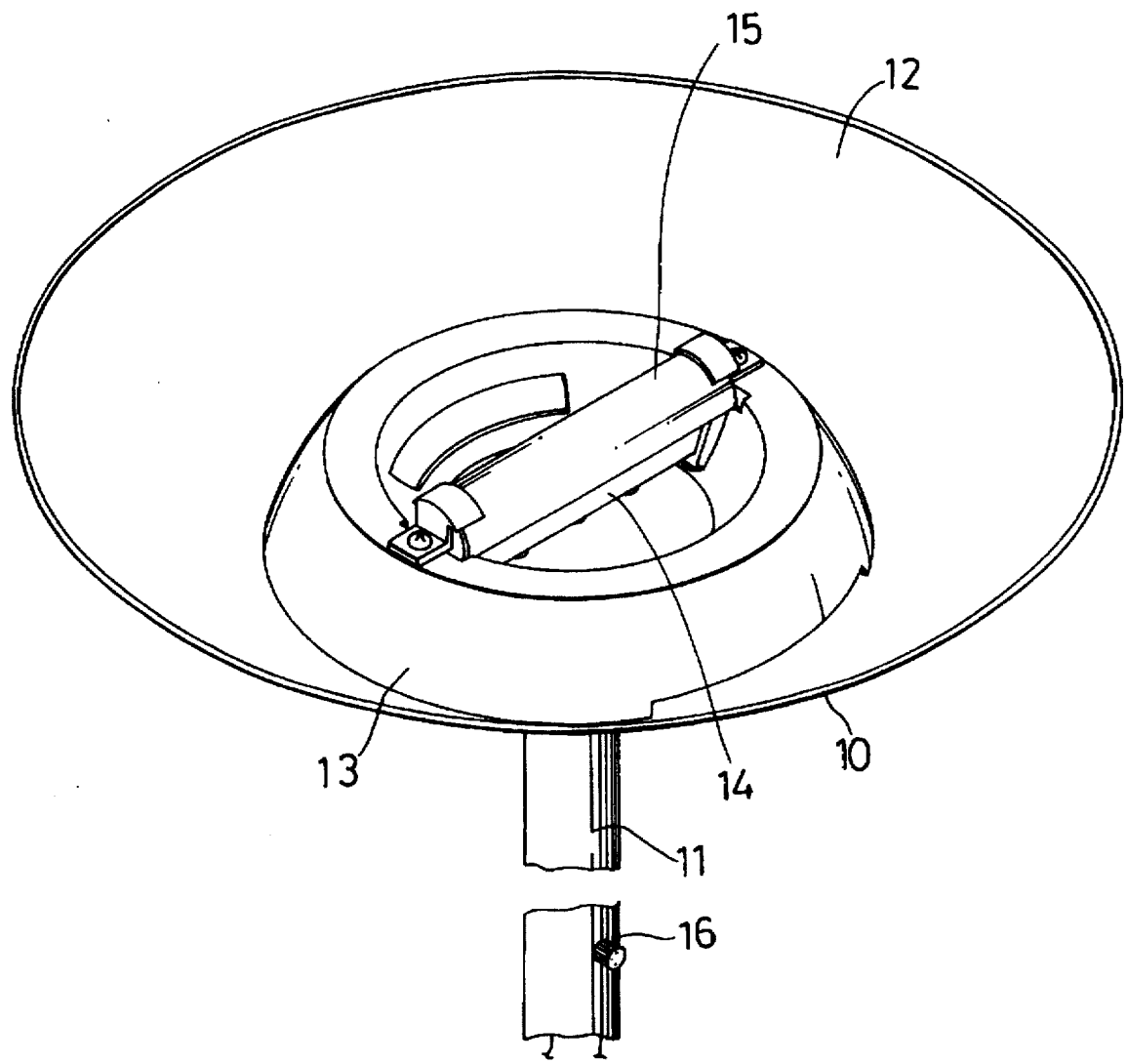
FIG. 1 is a fragmentary perspective view of a conventional halogen stand lamp.

Before the present invention is described in greater detail, it should be noted that like elements are denoted by the same reference numerals throughout the disclosure.

Figure 2:
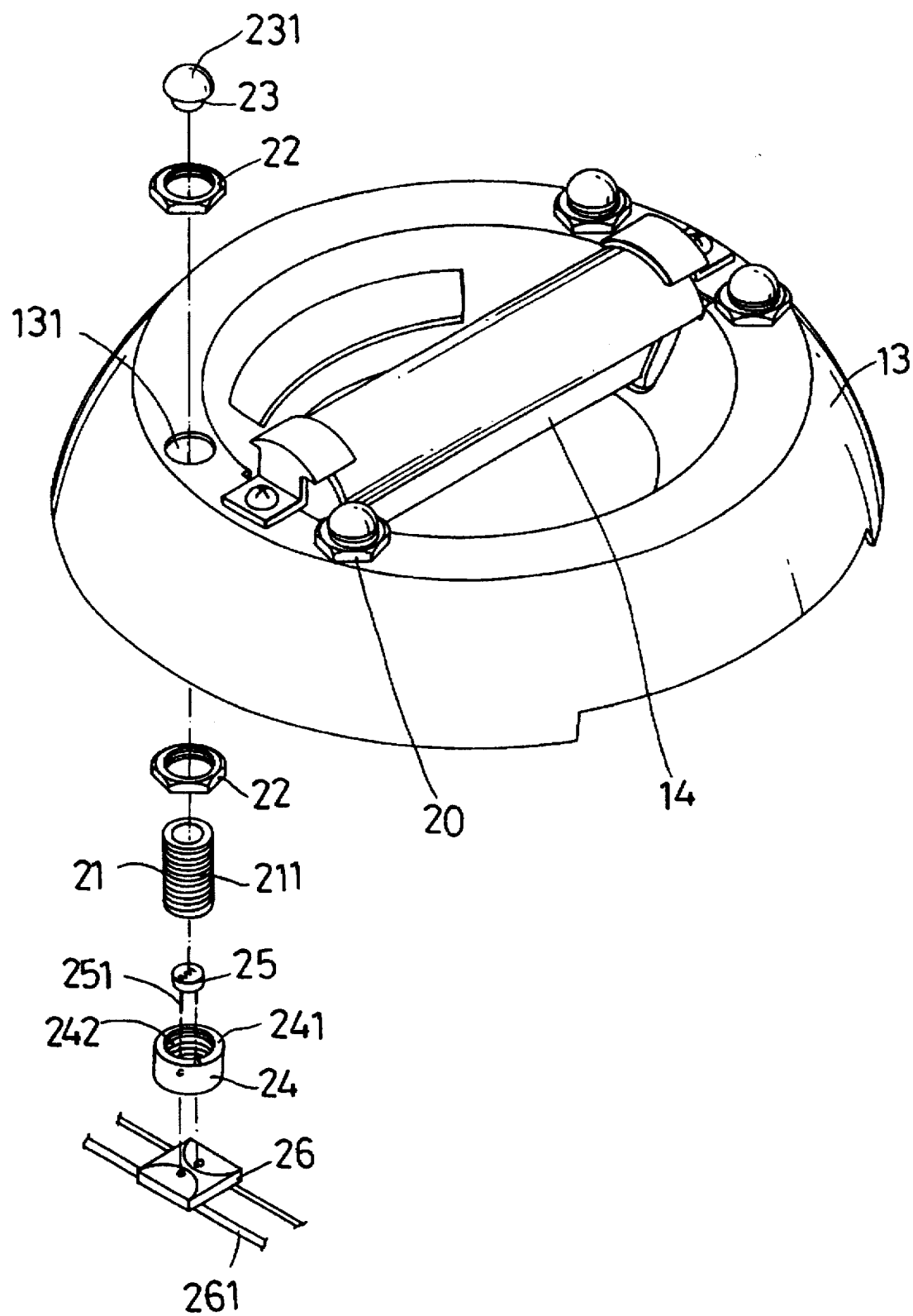
FIG. 2 illustrates a reflector of a stand lamp which is provided with sensor units according to the preferred embodiment of a protective device of this invention.
Figure 3:
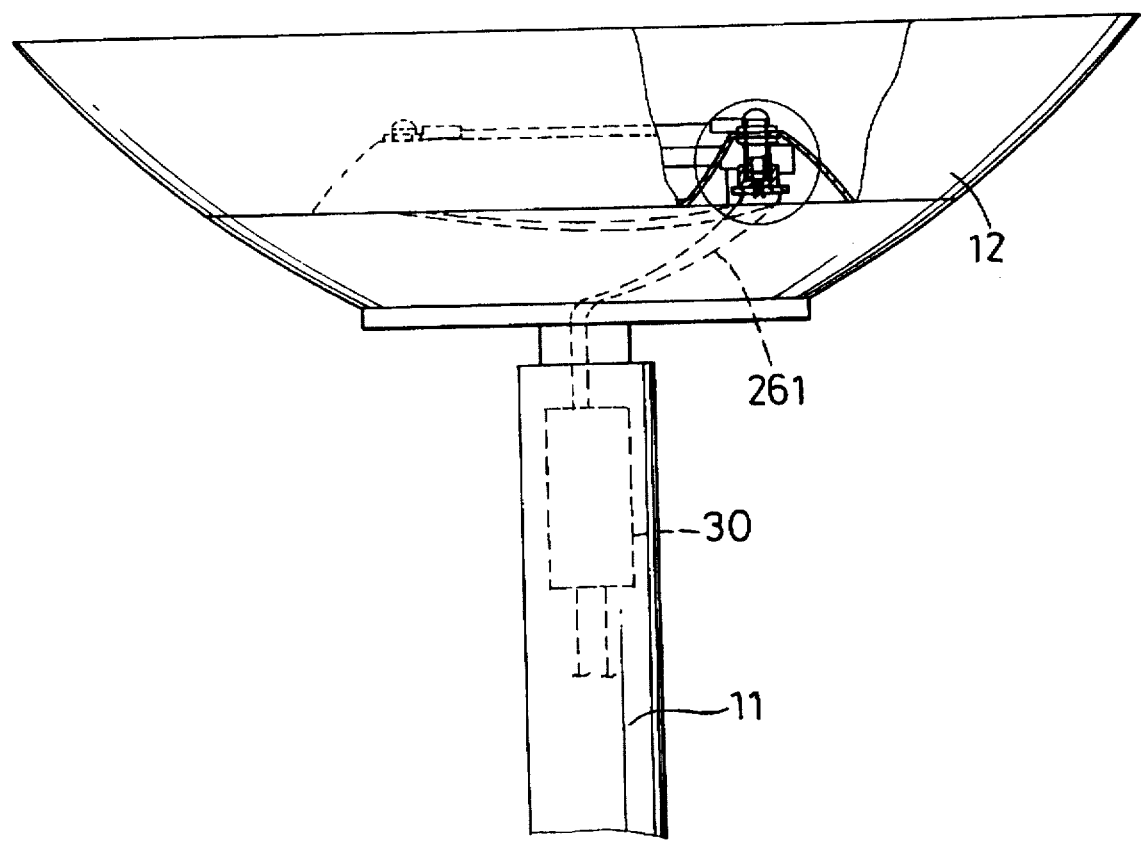
FIG. 3 is a schematic partly sectional view of a stand lamp which incorporates the preferred embodiment, one of the sensor units being illustrated in cross-section.
Figure 4:
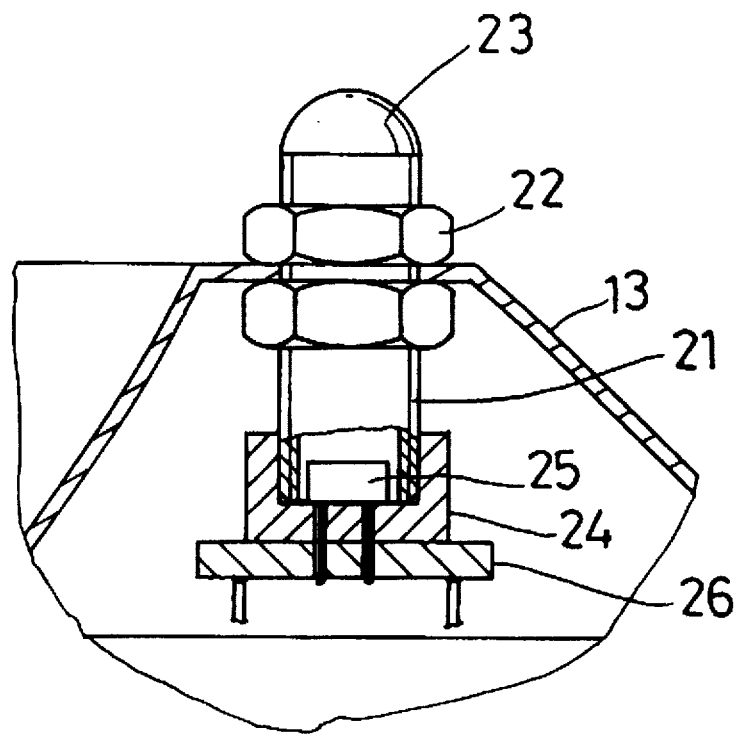
FIG. 4 is an enlarged view of an encircled portion found in FIG. 3.

Referring to FIGS. 2, 3 and 4, the preferred embodiment of a protective device according to the present invention is shown to be applied to a halogen stand lamp 10 which includes an upright hollow lamp stand 11, a bowl-shaped lamp base 12 mounted on a top end of the lamp stand 11, a ring-shaped reflector 13 mounted on the lamp base 12, a halogen lamp 14 mounted horizontally on the lamp base 12 and confined by the reflector 13, a cover piece 15 mounted on the reflector 13 above the halogen lamp 14 for protecting the halogen lamp 14, and a three-way power switch 16 (see FIGS. 5 and 6) manually operable so as to control activation and deactivation of the halogen lamp 14.

The reflector 13 has a peripheral portion formed with a plurality of upright through holes 131. In this embodiment, the reflector 13 is formed with two pairs of spaced through holes 131. The through holes 131 in each of the pairs are respectively disposed adjacent to left and right sides of a corresponding one of two end portions of the halogen lamp 14.

The protective device of the preferred embodiment includes at least one sensor unit 20 and a control circuit 30 which is adapted to be received in the lamp stand 11. In this embodiment, there are four sensor units 20, each of which comprises a light guiding tube 21, a pair of nuts 22, a light directing cap 23, a mounting base 24, a light sensor 25 and a circuit board 26.

The light guiding tube 21 is made of an opaque material and is formed with an external screw thread 211. The light guiding tube 21 is extended through a respective one of the through holes 131 in the reflector 13, and the nuts 22 threadedly engage the light guiding tube 21 at upper and lower sides of the reflector 13 to mount the light guiding tube 21 on the latter. The light directing cap 23 is made of a transparent plastic material and is mounted on a top end of the light guiding tube 21. The light directing cap 23 prevents the entry of dust into the light guiding tube 21, and has a convex top surface 231 to enhance the ability thereof to direct light into the light guiding tube 21. The mounting base 24 has an annular surrounding wall 241 with an internally threaded surface 242 for mounting threadedly the mounting base 24 on a lower end portion of the light guiding tube 21. The light sensor 25, which is preferably a photo resistor, is disposed in the mounting base 24 and has a pair of terminals 251 that extend downwardly through the mounting base 24 for welding onto the circuit board 26. A pair of contact wires 261 are welded onto the circuit board 26 and serve as terminals of the sensor unit 20.

Figure 5:
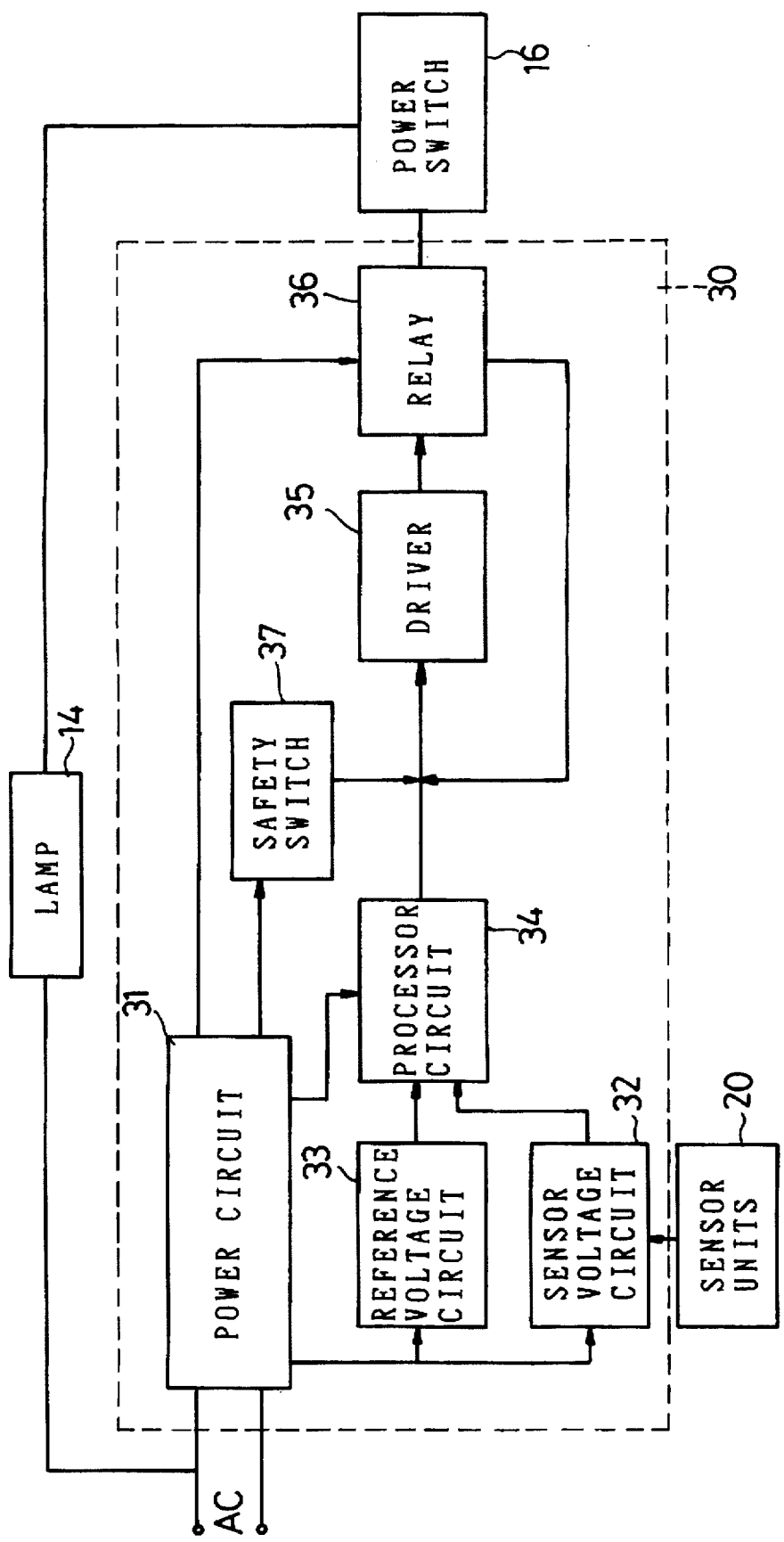
FIG. 5 is a schematic circuit block diagram of a stand lamp which incorporates the preferred embodiment.
Figure 6:
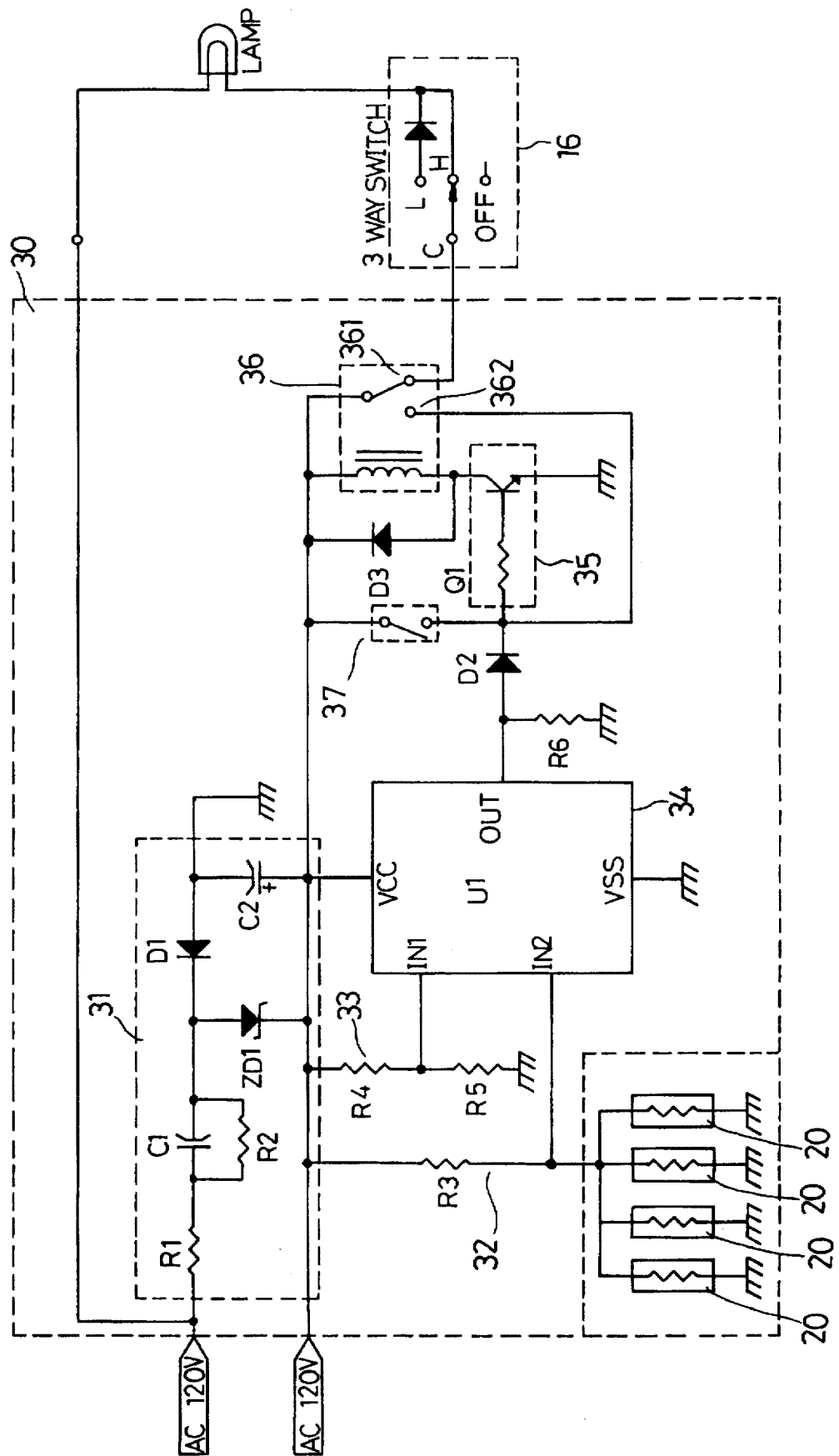
FIG. 6 is a schematic electrical circuit diagram of the stand lamp which incorporates the preferred embodiment.

Referring to FIGS. 5 and 6, the control circuit 30 comprises a power circuit 31, a sensor voltage circuit 32, a reference voltage circuit 33, a processor circuit 34, a driver 35, a relay 36 and a safety switch 37.

The power circuit 31 includes resistors R1, R2, capacitors C1, C2, a zener diode ZD1 and a diode D1. The power circuit 31 serves to limit, rectify, regulate and filter a 120-volt AC line power source. The sensor voltage circuit 32 includes a resistor R3 which connects the sensor units 20 to the power circuit 31 so as to enable the sensor units 20 to generate a sensor voltage signal corresponding to the intensity of light detected by the sensor units 20. The reference voltage circuit 33 is connected to the power circuit 31 and includes a voltage divider circuit constituted by resistors R4, R5. The reference voltage circuit 33 generates a reference voltage signal. The processor circuit 34 is connected to the sensor voltage circuit 32 and the reference voltage circuit 33, and receives the reference voltage signal and the sensor voltage signal at input terminals IN1, IN2 thereof. The driver 35 includes a transistor Q1 having a base terminal, which serves as an input of the driver 35, connected to an output terminal of the processor circuit 34. The relay 36 has a coil which interconnects a collector terminal of the transistor Q1 and the power circuit 31, a normally closed contact 361 connected to an input side of the power switch 16, and a normally open contact connected to the output terminal of the processor circuit 34. The safety switch 37 interconnects the power circuit 31 and the input of the driver 35. In this embodiment, the safety switch 37 is implemented as a normally open spring switch, the purpose of which will be described hereinafter.

In operation, the relay 36 normally connects the input side of the power switch 16 to the power circuit 31. As such, when the power switch 16 is operated to activate the halogen lamp 14, current can be supplied to the halogen lamp 14 via the relay 36 and the power switch 16. At this time, the light sensors 25 of the sensor units 20 receive some light generated by the halogen lamp 14 and reflected by the reflector 13. The sensor voltage circuit 32 generates a sensor voltage signal corresponding to the intensity of the light detected by the sensor units 20, and the processor unit 34 compares the sensor voltage signal with the reference voltage signal from the reference voltage circuit 33. The value of the reference voltage signal is selected such that, under normal conditions, the processor unit 34 does not activate the driver 35.

When a flammable object, such as a curtain, is blown into the lamp base 12 and covers the reflector 13 (see FIGS. 2 and 3), a stronger amount of light is directed into the light guiding tubes 21 of the sensor units 20. The resistances of the light sensors 25 vary, thereby resulting in a corresponding change in the sensor voltage signal. At this time, the processor unit 34 generates a pulse signal to activate the driver 35, thereby energizing the coil of the relay 36. Once energized, the relay 36 disconnects the power switch 16 from the power circuit 31, thereby automatically deactivating the halogen lamp 14 to prevent burning of the flammable object that covers the reflector 13.

In order to once more activate the halogen lamp 14, the power switch 16 is operated to the OFF position before operating the same to any of two ON positions (L, H).

In the event that the stand lamp is accidentally toppled, the safety switch 37, which can also be implemented as a mercury switch, is automatically closed, thereby connecting the driver 35 to the power circuit 31 so as to activate the driver 35. As such, the relay 36 is energized to automatically deactivate the halogen lamp 14, thereby further enhancing the safety features of the protective device of the present invention.

It should be noted that the nuts 22, which threadedly engage the light guiding tubes 21, permit adjustment of the positions of the light sensors 25 relative to reflector 13 to adjust, in turn, the sensitivity of the sensor units 20 as desired.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A protective device for a stand lamp which includes an upright lamp stand, a lamp base mounted on a top end of the lamp stand, a reflector mounted on the lamp base, and a lamp mounted on the lamp base and confined by the reflector, said protective device comprising:

at least one sensor unit adapted to be mounted on the reflector and capable of generating a sensor light signal corresponding to intensity of light detected thereby; and a control circuit connected electrically to said sensor unit and adapted to interconnect electrically the lamp and a power source, said control circuit being capable of disconnecting the lamp from the power source upon detection that the sensor light signal has reached a level indicative of a condition that the reflector is covered by an object to prevent occurrence of a fire.

2. The protective device as claimed in claim 1, wherein said control circuit comprises:

a sensor voltage circuit adapted to connect said sensor unit to the power source so as to enable said sensor unit to generate the sensor voltage signal;

a reference voltage circuit which generates a reference voltage signal; and a processor circuit connected to said sensor voltage circuit and said reference voltage circuit to receive the reference voltage signal and the sensor voltage signal therefrom.

3. The protective device as claimed in claim 1, wherein said control circuit comprises:

a processor circuit connected to said sensor unit to receive the sensor voltage signal therefrom;

a driver connected to said processor circuit and activated by said processor circuit upon detection that the sensor light signal has reached the level indicative of the condition that the reflector is covered; and a relay connected to said driver and adapted to interconnect the power source and the lamp, said relay being energized upon activation of said driver to break electrical connection between the power source and the lamp.

4. The protective device as claimed in claim 3, wherein said control circuit further comprises a safety switch adapted to interconnect the power source and said driver for activating said driver when the stand lamp is accidentally toppled.

5. The protective device as claimed in claim 1, wherein said sensor unit comprises:

a light guiding tube made of an opaque material and adapted to be mounted on the reflector; and a light sensor mounted in said light guiding tube.

6. The protective device as claimed in claim 5, wherein said sensor unit further comprises a light directing cap made of a transparent material and mounted on a top end of said light guiding tube to prevent entry of dust into said light guiding tube.

7. The protective device as claimed in claim 6, wherein said light directing cap has a convex top surface to enhance ability thereof to direct light into said light guiding tube.

8. The protective device as claimed in claim 5, wherein said light guiding tube is adapted to extend through the reflector and is formed with an external screw thread, said sensor unit further including a nut threadedly engaging said light guiding tube to mount adjustably said light guiding tube on the reflector to permit adjustment of sensitivity of said sensor unit.

* * * * *